May 17, 1966 G. E. DANIELS 3,251,609
TRACTOR-TRAILER COUPLING ASSEMBLY
Filed July 1, 1964 3 Sheets-Sheet 1

INVENTOR.
GORDON E. DANIELS
BY Shanley & O'Neil
ATTORNEYS.

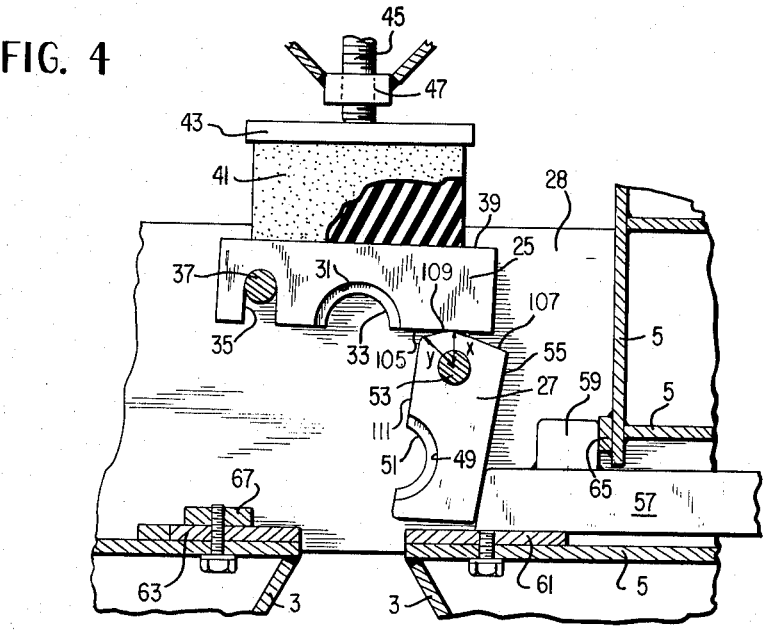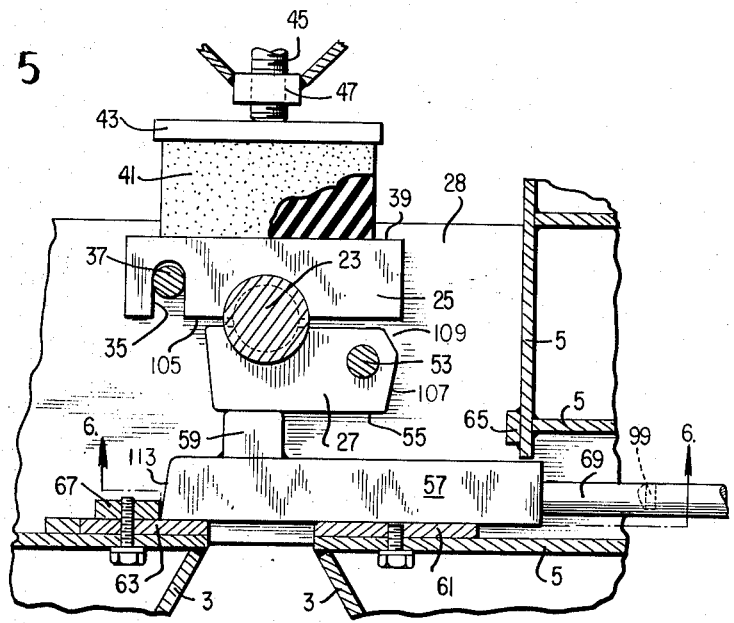

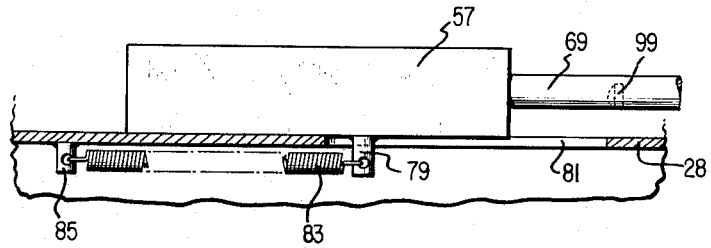
FIG. 6
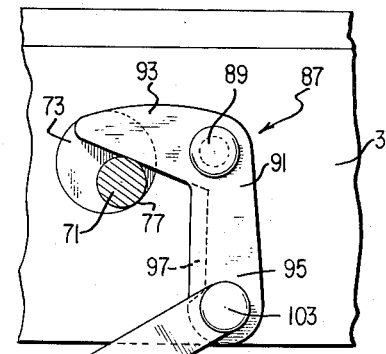
FIG. 8
FIG. 7
FIG. 9
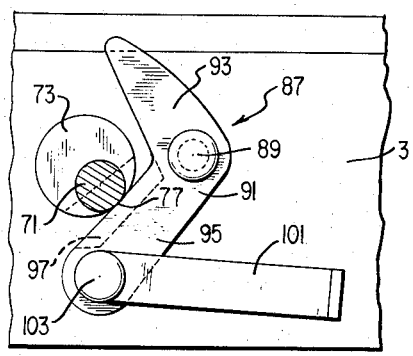
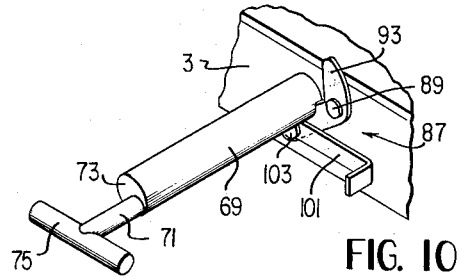
FIG. 10
FIG. 11
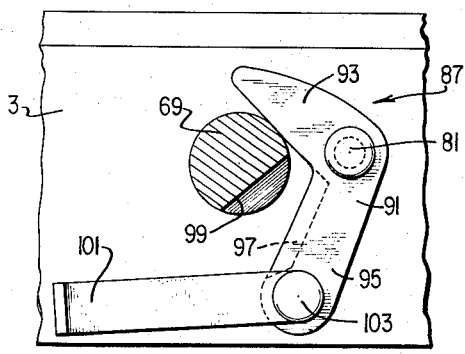
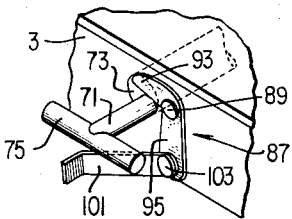
FIG. 12
INVENTOR.
GORDON E. DANIELS
BY Shanley & O'Neil
ATTORNEYS.

United States Patent Office 3,251,609
Patented May 17, 1966

3,251,609
TRACTOR-TRAILER COUPLING ASSEMBLY
Gordon E. Daniels, c/o Sanford-Day Corp., P.O. Box 1511, Knoxville, Tenn.
Filed July 1, 1964, Ser. No. 379,466
9 Claims. (Cl. 280—434)

The present invention relates to tractor-trailer coupling assemblies, more particularly of the fifth wheel type.

A primary objective of the present invention is to provide a tractor-trailer coupling assembly of the fifth wheel type in which improved means are provided for automatically locking and unlocking a tractor and trailed assembly. Inherent advantages of this improved automatic coupling means include provisions for absorbing and preventing damage from shocks that normally occur during coupling and uncoupling operations and during road travel.

The present invention also makes provision for maintaining coupling parts in desired locked or unlocked positions.

Other objects and advantages of the present invention will become more apparent from the description to follow. In the accompanying drawings:

FIGURE 4 is a fragmentary plan view of the coupling assembly of the invention with portions cut away and with parts in an open or unlocked position such as would be occupied by the assembly in the absence of a coupled kingpin; and FIGURE 5 is a view similar to FIGURE 4 but showing a kingpin locked in coupled assembly;

FIGURE 6 is an enlarged fragmentary side cross-sectional view taken on the line 6—6 of FIGURE 5;

FIGURE 7 is an enlarged fragmentary view of a portion of an operating shaft shown in FIGURE 5;

FIGURE 8 is an enlarged fragmentary cross-sectional view of a latch mechanism for maintaining the parts in the position shown in FIGURE 5;

FIGURE 9 is a view similar to FIGURE 8 but showing the parts in another position preparatory to unlatching the assembly of the present invention;

FIGURE 10 is a fragmentary perspective view showing a portion of the locking mechanism in released position in preparation for an uncoupling operation;

FIGURE 11 is a view of the latch mechanism of FIGURES 8 and 9 showing the parts in the position they occupy after an uncoupling operation; and FIGURE 12 is a view similar to FIGURE 10 showing a portion of the locking mechanism in the locked position of FIGURE 5 and latched as shown in FIGURE 8.

A fifth wheel is ordinarily carried by the tractor portion of the assembly for releasably retaining a kingpin of the trailer portion of the assembly. Such fifth wheels are disposed generally horizontally or downwardly rearwardly inclined. It is of course to be understood, however, that various other orientations and uses of the fifth wheel of the present invention are included within the scope of the present invention.

Figure 1:
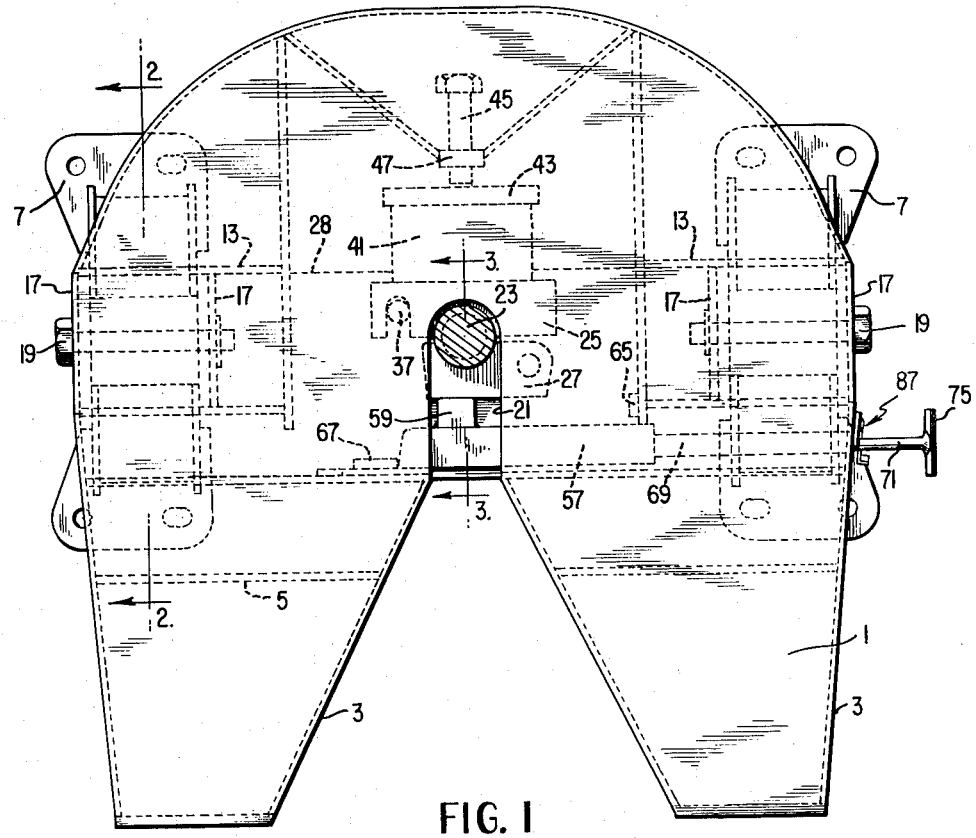
FIGURE 1 is a top plan view of a tractor-trailer coupling assembly of the fifth wheel type, according to the present invention.

The fifth wheel of FIGURE 1 includes the usual top plate 1 surrounded by a downwardly depending marginal flange 3 and braced and reinforced by strengthening members 5 fixedly secured to its underside. The top plate and fifth wheel are mounted on the tractor vehicle or other support for the fifth wheel by means of brackets 7, preferably disposed one on either side of the fifth wheel. Each bracket 7 terminates upwardly in a block 9 (see FIGURE 2), the bracket providing an opening 11 extending all the way beneath the block. Downwardly depending ribs secured to the underside of top plate 1 are disposed in the form of a generally rectangular cage 13 in which is disposed a resilient shoe 15 of rubber or other elastic deformable material. Shoe 15 is recessed on its underside to receive at least a greater portion of block 9 therein. Cage 13 has ears 17 that depend downwardly on either side thereof and that have openings therethrough for the reception of bolt 19 that extends all the way through the mounting assembly through both ears 17 and through openings 11 and beneath block 9. Appropriate fastenings on each bolt 19 retain the bolts in the desired position. Bolts 19 have the same axis and extend toward each other from the outer side of flange 3.

Figure 2:
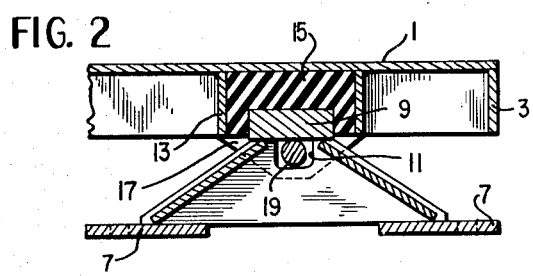
FIGURE 2 is an enlarged fragmentary cross-sectional view taken on the line 2—2 of FIGURE 1.

Top plate 1 is thus supported on brackets 7 through rubber shoes 15, the cages 13 turning with the fifth wheel and the blocks 9 remaining fixed. The bolts 19 bearing against the underside of blocks 9 retain the fifth wheel in assembly on its brackets. Preferably, the center of gravity of the fifth wheel is disposed rearwardly of the common axis of bolts 19, so that the fifth wheel tends to rock downwardly rearwardly, that is, into a position in which top plate 1 is turned somewhat counterclockwise from its position shown in FIGURE 2. Each rubber shoe 15 will thus ordinarily be somewhat more compressed at its left side as shown in FIGURE 2 than at its right side, and the fifth wheel will be somewhat more favorably disposed for the reception of a kingpin in its usual orientation on a tractor type vehicle.

As is usual in fifth wheel constructions, the rear of the fifth wheel is bifurcated as seen in FIGURE 1 and the bifurcation terminates forwardly in a medial slot 21. Most of the length of the bifurcation is bordered by portions of flange 3. The purpose of the bifurcation is to guide a kingpin 23 into slot 21.

Figure 3:
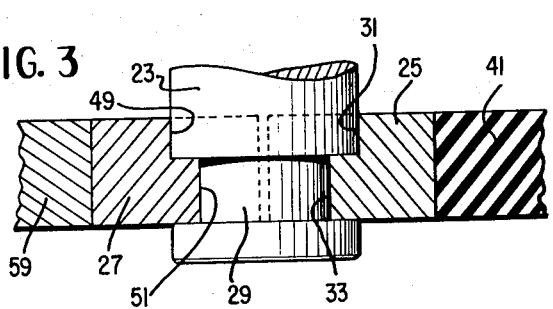
FIGURE 3 is an enlarged fragmentary cross-sectional view taken on the line 3—3 of FIGURE 1.

FIGURES 4 and 5 are plan views of the fifth wheel of the invention with the top plate 1 removed. A pair of jaws 25 and 27 are carried by the fifth wheel below top plate 1 and above an under plate 28. Kingpin 23, as seen in FIGURE 3, has an annular reduced portion 29 adjacent its lower end, and jaw 25 is provided with corresponding recesses. Specifically, jaw 25 is provided with an annular recess 31 along its rear face. Recess 31 has a lower portion 33 of reduced radius so that jaw 25 enters into reduced portion 29 on kingpin 23.

Spaced to the left of recess 31 as seen in FIGURES 4 and 5, jaw 25 has a rearwardly opening slot 35 therein. Pin 37 is disposed in slot 35 and is fixed between top plate 1 and under plate 28, disposed in slot 35. Pin 37 is disposed a substantial distance to one side of the longitudinal midplane of slot 21 and is disposed forwardly of the axis of kingpin 23 when kingpin 23 is fully engaged in the locking device as in FIGURE 5. Jaw 25 may thus move bodily forwardly and rearwardly relative to pin 37 and, at the same time, jaw 25 may turn about a pivot provided by pin 37.

At the forward end of jaw 25, surface 39 is in contact with resilient block 41 formed of rubber or other elastic deformable material. Jaw 25 is continuously yieldably urged rearwardly by block 41. Block 41, in turn, is backed up by a backing plate 43. An adjustment screw 45 is carried by an internally screw-threaded bracket 47, the latter being fixedly secured to the underside of top plate 1. This provides means for adjustably positioning block 41 forwardly or rearwardly, and for adjusting the compression of block 41, within desired limits.

Similar to jaw 25, jaw 27 has a recess 49 and a portion 51 of reduced radius that fits into reduced portion 29 of kingpin 23.

Referring to FIGURES 4 and 5, jaw 27 is mounted for swinging movement on a pin 53 fixed between top plate 1 and under plate 28. Pin 53 is positioned on the opposite side of the longitudinal midplane of slot 21 from pin 37 and rearwardly of the axis of kingpin 23 when kingpin 23 is fully engaged in the locking device.

The axis of swinging movement of jaw 27 is fixed, that is, jaw 27 has only swinging movement and no bodily movement comparable to jaw 25.

Jaw 27 is elongated with rear surface 55. A locking bar 57 is mounted for sliding movement with lug 59 in contact with rear surface 55 when in the closed position shown in FIGURE 5. Locking bar 57 in combination with lug 59 holds jaw 27 closed in the locked position.

Guide plates 61 and 63 fixed to strengthening members 5 on either side of slot 21 guide the sliding movement of locking bar 57. Stop 65 limits retractive movement of locking bar 57, as shown in FIGURE 4, while a stop 67 limits locking movement of bar 57, as shown in FIGURE 5.

As is best seen in FIGURES 1 and 10, locking bar 57 includes a shaft 69, which extends to one side of the fifth wheel through an opening through flange 3 and rod 71 joined to shaft 69 at abutment shoulder 73. Rod 71 terminates in handle 75. Shaft 69 and rod 71 have a cylindrical outer contour. It will be noted, particularly in FIGURES 8–10, that rod 71 is not coaxial with shaft 69 but rather is offset from the axis of shaft 69 downwardly and forwardly. They share a common tangent at line 77 shown in FIGURE 8.

Means are provided for resiliently urging the assembly of locking bar 57 toward locking position. These means include pin 79 secured to the underside of locking bar 57, coil tension spring 83, and anchor pin 85 secured to under plate 28. Coil tension spring 83 is mounted between pin 79 and anchor pin 85. Locking bar 57 is drawn outwardly against the action of spring 83, or when released, moves inwardly under the influence of spring 83.

In the retracted position of locking bar 57, shown in FIGURE 4, shaft 69 extends a substantial distance laterally outwardly of the fifth wheel beyond flange 3. In an engaged or locked position of locking bar 57, however, as is seen in FIGURES 1 and 5, shaft 69 is so positioned that abutment shoulder 73 is about flush with the outer surface of flange 3.

A safety latch assembly 87 is provided, as shown in FIGURES 8–12. Assembly 87 can be mounted for vertical swinging movement on bolt 89 secured to flange 3. Assembly 87 includes a latch 91 having a pair of latching arms 93 and 95. Latching arm 95 has a beveled portion 97 adapted to fit into beveled notch 99 (FIGURE 7) in shaft 69. Latching arm 95 carries counterweight 101 mounted for vertical swinging movement on and relative to latching arm 95 by bolt 103. Preferably, latching arm 95 and counterweight 101 are yieldably urged apart by a spring washer (not shown) so that latch 91 and counterweight 101 can be swung relative to each other to various adjusted positions but when so swung will retain their adjusted position.

To couple a truck and trailer assembly as shown in FIGURE 4, the truck is backed firmly against the trailer with the trailer braked. The kingpin of the trailer is thus pushed forwardly against the forward jaw 25. This compresses rubber block 41 and moves jaw 25 away from engagement with a holding surface of jaw 27. Spring 83 then draws locking bar 57 to the left to the position shown in FIGURE 5 closing jaw 27 of the kingpin.

Safety latch assembly 87 is in the position shown in FIGURE 11 before locking. After locking, safety latch assembly 87 falls, because of counterweight 101, into the position of FIGURE 8. In that position, latching portion 93 is disposed behind abutment shoulder 73 of shaft 69 and holds the parts in that position so that locking bar 57 cannot inadvertently move to the right. The counterweight 101 serves to retain latch arm 93 in the position shown in FIGURE 8, i.e. resting on rod 71. This is the transit or traveling position of the parts.

When it is desired to uncouple the tractor-trailer assembly, counterweight 101 is swung counterclockwise from the position of FIGURE 8 to the position of FIGURE 9. In this position, the orientation of counterweight 101 is such that latch 91 is caused to swing clockwise about bolt 89 to the position of FIGURE 9, so that latching arm 93 is no longer disposed to contact abutment shoulder 73. Instead, latching arm 95 contacts rod 71 at a point along line 77.

Pulling handle 75 outwardly permits shaft 69 and rod 71 and locking bar 57 to be drawn to the position shown in FIGURE 4, against the action of spring 83. Latch 91 bears against rod 71 and shaft 69 during withdrawal of the locking bar assembly, along line 77. Since line 77 is common to the peripheries of both rod 71 and of shaft 69, the relative sliding movement is smooth and no portion of abutment shoulder 73 contacts latch 91.

Shaft 69 is withdrawn sufficiently that latch 91 is aligned with notch 99. Thereupon, beveled portion 97 of latching arm 95 falls into notch 99 under the action of counterweight 101. Locking bar 57 at this stage is in the position shown in FIGURE 4. One side of each of notch 99 and latching arm 95 is beveled, while the other side is perpendicular to the axis of shaft 69. These perpendicular surfaces are engaged to prevent inadvertent return of the assembly of locking bar 57.

In the withdrawn position of locking bar 57, the truck can simply be driven forward with the kingpin of the trailer remaining relatively stationary. Jaw 27 pivots with rounded surface 109 contacting rubber block 41 until the parts reach the position shown in FIGURE 4. The position of the latching mechanism is as shown in FIGURE 10 and jaw 27 is positioned as shown in FIGURE 4.

In preparing to return parts to coupled relationship, counterweight 101 is swung to the position of FIGURE 11. Once the counterweight is swung to that position, the center of gravity of the latching assembly is such that latch assembly 87 swings counterclockwise withdrawing latching arm 95 from notch 99. Latching arm 93 rests against shaft 69 and the latch assembly does not prevent the return of locking bar 57. However return is prevented by the pressure of block 41 against jaw 25 which holds jaw 27 in an open position.

A truck is then backed against the kingpin of a trailer until block 41 is compressed. Jaw 27 is then free to swing because jaw 25 has been pushed forwardly by the kingpin. Spring 83 thus draws locking bar 57 to the left again as seen in FIGURES 4–6, which causes jaw 27 to swing clockwise from the position of FIGURE 4 to the position of FIGURE 5. Latching arm 93 rides along shaft 69 until the end of shaft 69 is reached, whereupon latching arm 93 again falls behind abutment shoulder 73 to the position shown in FIGURE 8. The assembly is automatically locked and latched in the travel position.

The contiguous surfaces of jaws 25 and 27 cooperate with each other in a special way which is an important feature of the present invention and will be described in more detail. Specifically, a rear surface 105 of jaw 25 cooperates with an end surface 107, a rounded shoulder 109 and a surface 111 on jaw 27.

On jaw 27, surface 107 is so oriented that in the open position of the parts, as shown in FIGURE 4, a portion of surface 107 at shoulder 109 will be in contact with surface 105. Surfaces 105 and 107 in that position are urged together by block 41, jaw 25 swinging about the axis provided by pin 37, which is then in the bottom or forward end of slot 35. In that position, the common interface of surfaces 105 and 107 is positioned a distance from the axis of pin 53 which is represented by the letter $x$ in FIGURE 4.

In the closed position of the parts surfaces 105 and 111 are substantially parallel to each other. In the position of FIGURE 5, block 41 is compressed as shown by pin 37, which is spaced from the forward end of slot 35.

In moving from the open position of FIGURE 4 toward the closed position of FIGURE 5, jaw 27 turns so that the line of contact between jaws 25 and 27 rides counterclockwise around shoulder 109 as seen in FIGURE 4. However, at least a portion of shoulder 109 is so shaped that the surface of shoulder 109 is spaced from the axis of pin 53 a distance indicated by the letter $y$ in FIGURE 4, which is substantially greater than the distance $x$. With the radial distance of the surface at shoulder 109 greater than the distance $x$ there is a lever action on jaw 27 which tends to force jaw 27 to the position shown in FIGURE 4 and maintain jaw 27 in that position. For jaw 27 to swing clockwise from the position of FIGURE 4 block 41 must be compressed.

In order to couple a tractor-trailer, block 41 is compressed by a kingpin acting against surface 31. Locking bar 57 then moves jaw 27 to the position shown in FIGURE 5 and lug 59 maintains jaw 27 in that position.

Although a specific embodiment of the present invention has been described and illustrated, modifications and variations may be resorted to without departing from the spirit of the invention. It is to be understood that the scope of the present invention is to be determined from the appended claims.

What is claimed is:

1. A fifth wheel having a medial slot open at one end for the reception of a kingpin, a pair of jaws carried by the fifth wheel adjacent the slot for releasably gripping a kingpin between them, means mounting one of said jaws for horizontal swinging movement about a first upright axis and for bodily movement lengthwise of the slot, and means continuously yieldably urging said one jaw lengthwise of the slot toward the open end of the slot to tend to maintain the other jaw in release position.

2. A fifth wheel as claimed in claim 1, and means mounting the other jaw for horizontal swinging movement about a second upright axis.

3. A fifth wheel as claimed in claim 1, said first axis being disposed a substantial distance to one side of the longitudinal midplane of the slot.

4. A fifth wheel as claimed in claim 3, the axis of a kingpin clamped between said jaws lying in a plane perpendicular to the length of the slot, said first axis being disposed on the side opposite and said second axis being disposed on the same side of said plane as the open end of the slot.

5. A fifth wheel as claimed in claim 3, said axes being disposed on opposite sides of the slot.

6. A fifth wheel as claimed in claim 5, said first axis being disposed a substantial distance to one side of the longitudinal midplane of the slot.

7. A fifth wheel as claimed in claim 5, said axes being disposed on opposite sides of the longitudinal midplane of the slot.

8. Fifth wheel structure of the type used in coupling vehicles by means of a kingpin and kingpin gripping means including
    guide means for a kingpin defining a medial slot lying along the longitudinal midplane of the fifth wheel structure, the medial slot being tapered toward an apex,
    compressing means located along the longitudinal midplane of the fifth wheel structure contiguous with the apex of the medial slot, and
    jaw means for releasably gripping a kingpin located contiguous with the apex of the medial slot, the jaw means including a receiving section in contact with the compressing means, the receiving section being mounted on the fifth wheel structure for longitudinal movement along the longitudinal midplane of the fifth wheel structure, and a locking section capable of pivotal movement to grip and release a kingpin in combination with the receiving section; the compressing means urging the receiving section of the jaw means toward the locking section of the jaw means with the receiving jaw section and locking jaw section including inter-acting surfaces which tend to maintain the locking jaw section fixed with relation to the receiving jaw section under urging from the compressing means when the locking jaw section is in released position, and
    means including a spring actuated locking bar means for pivoting the locking jaw section into position to grip a kingpin.

9. The structure of claim 8 further including safety means for latching the locking bar means in locked position.

References Cited by the Examiner

UNITED STATES PATENTS

| | | | |
|---|---|---|---|
| 1,981,233 | 11/1934 | Harris | 280—434 |
| 1,991,507 | 2/1935 | Ketel | 280—434 |
| 2,610,069 | 9/1952 | Ketel | 280—434 |

LEO FRIAGLIA, *Primary Examiner.*